(12) United States Patent
Bowers et al.

(10) Patent No.: US 8,721,073 B2
(45) Date of Patent: May 13, 2014

(54) OPHTHALMIC LENS WITH REPEATING WAVE PATTERNS

(75) Inventors: Angie L. Bowers, Jacksonville, FL (US); Jeffrey H. Roffman, Saint Johns, FL (US); James Michalski, St. Johns, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 13/549,563

(22) Filed: Jul. 16, 2012

(65) Prior Publication Data
US 2014/0016084 A1 Jan. 16, 2014

(51) Int. Cl.
G02C 7/04 (2006.01)

(52) U.S. Cl.
USPC ............. 351/159.31; 351/159.32; 351/159.24

(58) Field of Classification Search
USPC ............. 351/159.24–159.27, 159.29–159.32, 351/159.64, 159.66, 159.81
See application file for complete search history.

(56) References Cited

U.S. PATENT DOCUMENTS

| | | | |
|---|---|---|---|
| 5,057,578 A | 10/1991 | Spinelli | |
| 5,314,960 A | 5/1994 | Spinelli et al. | |
| 5,371,147 A | 12/1994 | Spinelli et al. | |
| 5,963,298 A | 10/1999 | Bard | |
| 2003/0025873 A1 | 2/2003 | Ocampo | |
| 2005/0001978 A1 | 1/2005 | Ocampo | |
| 2005/0128433 A1* | 6/2005 | Jahnke | 351/162 |
| 2012/0147319 A1* | 6/2012 | Corti et al. | 351/159.3 |

FOREIGN PATENT DOCUMENTS

| | | |
|---|---|---|
| EP | 0390443 B1 | 10/1990 |
| WO | WO 91/06886 A1 | 5/1991 |

OTHER PUBLICATIONS

European Search Report dated Nov. 12, 2013 for Application No. EP13176727.

* cited by examiner

Primary Examiner — Ricky Mack
Assistant Examiner — William Alexander
(74) Attorney, Agent, or Firm — Carl J. Evens

(57) ABSTRACT

An ophthalmic lens incorporating a repeating periodic wavelike pattern of pigmented lines is utilized to highlight, shade and expose the iris of the wearer to create an enhanced look without affecting the natural appearance of the iris. The ophthalmic lens incorporates the repeating periodic wavelike pattern of pigmented lines in a region corresponding to the wearer's iris.

15 Claims, 4 Drawing Sheets

OPHTHALMIC LENS WITH REPEATING WAVE PATTERNS

BACKGROUND OF THE INVENTION

1. Field of the Invention

The present invention relates to ophthalmic lenses, and more particularly to contact lenses incorporating features that enhance the eye and surrounding structures.

2. Discussion of the Related Art

Myopia or nearsightedness is an optical or refractive defect of the eye wherein rays of light from an image focus to a point before they reach the retina. Myopia generally occurs because the eyeball or globe is too long or the cornea is too steep. A minus powered spherical lens may be utilized to correct myopia. Hyperopia or farsightedness is an optical or refractive defect of the eye wherein rays of light from an image focus to a point after they reach or behind the retina. Hyperopia generally occurs because the eyeball or globe is too short or the cornea is too flat. A plus powered spherical lens may be utilized to correct hyperopia. Astigmatism is an optical or refractive defect in which an individual's vision is blurred due to the inability of the eye to focus a point object into a focused image on the retina. Unlike myopia and/or hyperopia, astigmatism has nothing do to with globe size or cornea steepness, but rather it is caused by an abnormal curvature of the cornea. A perfect cornea is spherical whereas in an individual with astigmatism, the cornea is not spherical. In other words, the cornea is actually more curved or steeper in one direction than another, thereby causing an image to be stretched out rather than focused to a point. A cylindrical lens rather than a spherical lens may be utilized to resolve astigmatism.

Contact lenses may be utilized to correct myopia, hyperopia, astigmatism as well as other visual acuity defects. Contact lenses may also be utilized to enhance the natural appearance of the wearer's eyes. In other words, contact lenses may be colored or tinted to provide a variety of effects to the appearance of the eye. A number of different types of tinted contact lenses are currently available to enhance an individual's eye color or change it altogether. Contact lenses comprising cosmetic enhancement tints are designed to enhance ones natural eye color and are best suited for light-colored eyes such as blues, greens, hazels and grays. Contact lenses comprising opaque tints are designed to change the color of dark eyes. These lenses are patterned and are designed to cover the iris while providing a natural look. Contact lenses may also comprise visibility tints which are designed to make the lens visible during handling with no discernible effect on eye color.

The use of tinted or colored contact lenses to alter or enhance the natural color of the iris is well known. In manufacturing conventional tinted contact lenses, it is known to use either or both translucent and opaque colors in one layers of color with the object of creating a natural appearing tinted iris. Typically, the color layers are each applied at a single thickness. This provides color variation only with the use of multiple colors or points at which the translucent color overlaps another color layer. However, the natural iris is composed of a large number of different colors and color combinations intermixed to create color variations. The relatively small number of colors and color layers that may be utilized in producing tinted contact lenses limits the designer's ability to create a natural appearing lens. Accordingly, it would be advantageous to create eye color enhancement above and beyond simply altering the color of the iris.

SUMMARY OF THE INVENTION

The ophthalmic lens with repeating wave patterns of the present invention overcomes a number of disadvantages associated with the prior art as briefly described above.

In accordance with one aspect, the present invention is directed to an ophthalmic device configured to alter the appearance of an eye. The ophthalmic device comprises a contact lens having a central zone which includes a pupil region at the center thereof and an effect zone positioned around the perimeter of the central zone, and a peripheral zone surrounding the central zone, the central zone being sized to substantially correspond in size to an iris of an eye, and a series of pigmented lines arranged in a wavelike, repeating pattern formed in the effect zone of the central zone of the contact lens, the pigmented lines having predetermined thicknesses and spacing there between and configured with peaks and troughs that radiate towards and away from the pupil region, wherein the predetermined thicknesses and spacing are variable for adding shading and depth to the iris when the contact lens is on eye.

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials, were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials.

Currently available contact lenses remain a cost effective means for vision correction. The thin plastic lenses fit over the cornea of the eye to correct vision defects, including myopia or nearsightedness, hyperopia or farsightedness, astigmatism, i.e. asphericity in the cornea, and presbyopia i.e. the loss of the ability of the crystalline lens to accommodate. Contact lenses are available in a variety of forms and are made of a variety of materials to provide different functionality. Daily wear soft contact lenses are typically made from soft polymer materials combined with water for oxygen permeability. Daily wear soft contact lenses may be daily disposable or extended wear disposable. Daily disposable contact lenses are usually worn for a single day and then thrown away, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a translucent tint that is meant to enhance one's natural eye color, the color tint contact lens comprises a darker, opaque tint meant to change one's eye color, and the light filtering tint contact lens functions to enhance certain colors while muting others. Rigid gas permeable hard contact lenses are made from siloxane-containing polymers but are more rigid than soft contact lenses and thus hold their shape and are more durable. Bifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

Contact lenses may be colored or tinted to provide a variety of effects to the appearance of the eye. The contact lenses may be utilized to correct a problem with the appearance of the eye or for cosmetic purposes. The present invention is directed to contact lenses which enhance the appearance of the eye when worn over the iris by incorporating repeating periodic waves for highlighting, shading and exposing the iris to create a natural appearance. Unlike the use of dots, dot matrix and/or other methods, the repeating wave technique utilizes the geometry of wavelike lines to provide a natural appearance.

The present invention relates to the use of periodic repeating wavelike line patterns which are derived from trigonometric, Fourier, polynomial, or similar functions. Examples of polynomial functions include the Taylor, Maclaurin or Chebyshev series. When placed onto an ophthalmic lens, these periodic repeating patterns are used to create a cosmetic effect on the iris. The lines may be of equal thickness, width, and spacing or unequal thickness, width, and spacing; however, in its preferred presentation the lines would be of equal width and thickness with unequal spacing thereby providing the illusion of shading and depth. The arrangement of the lines would provide peaks and troughs that radiate towards and away from the pupil creating a natural appearance and blending on the iris. The repeating waves of lines are pigmented to enhance the color of the iris. The space between the lines provides areas where the iris appears through the pigmented area hence blending with the natural iris.

The repeating wave patterns incorporated into contact lenses of the present invention provide an inexpensive and convenient way of cosmetically enhancing the appearance of the eyes. The enhancement is not so subtle as not to be noticed and not such that it lends an unnatural appearance to the wearer's iris.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Figure 1:
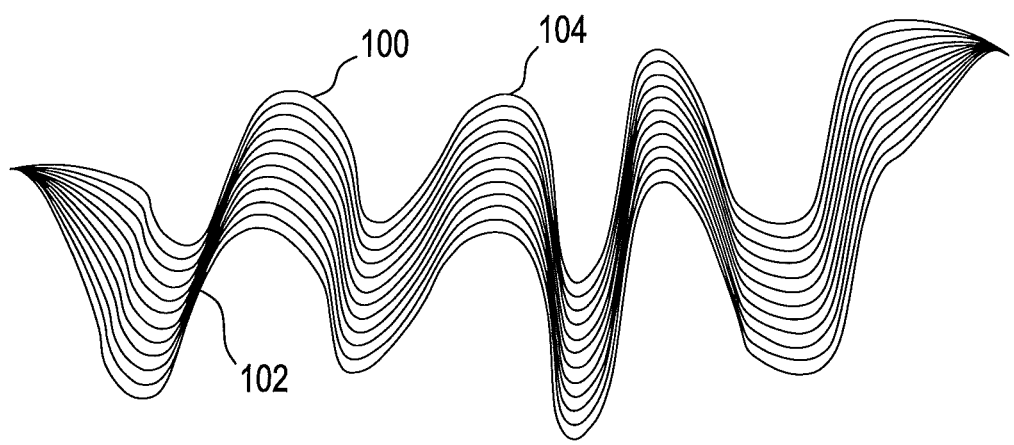
FIG. 1 illustrates a periodic, repeating wave pattern that may be utilized with contact lenses in accordance with the present invention.

Currently available contact lenses remain a cost effective means for vision correction. The thin plastic lenses fit over the cornea of the eye to correct vision defects, including myopia or nearsightedness, hyperopia or farsightedness, astigmatism, i.e. asphericity in the cornea, and presbyopia i.e. the loss of the ability of the crystalline lens to accommodate. Contact lenses are available in a variety of forms and are made of a variety of materials to provide different functionality. Daily wear soft contact lenses are typically made from soft polymer-plastic materials combined with water for oxygen permeability. Daily wear soft contact lenses may be daily disposable or extended wear disposable. Daily disposable contact lenses are usually worn for a single day and then thrown away, while extended wear disposable contact lenses are usually worn for a period of up to thirty days. Colored soft contact lenses use additional materials to provide different functionality. For example, a visibility tinted contact lens uses a light tint to aid the wearer in locating a dropped contact lens or to locate it in it's package, enhancement tint contact lenses have a translucent tint that is meant to enhance one's natural eye color, the color tinted contact lens comprises a darker, opaque tint meant to change one's eye color, and the light filtering tint contact lens functions to enhance certain colors while muting others. Rigid gas permeable hard contact lenses are made from silicone polymers but are more rigid than soft contact lenses and thus hold their shape and are more durable. Bifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

The white of the eye is known as the sclera. The sclera comprises a tough fibrous tissue that helps maintain the eye's shape and protects the inner structures of the eye. The iris is the colored portion of the eye and is the partition between the anterior and posterior chambers of the eye. The iris comprises two muscles that regulate the size of the central opening in the iris known as the pupil. The cornea is the clear covering over the iris and is the first light focusing element of the eye. The junction where the sclera stops and the cornea starts is called the limbus. Contact lenses may be utilized to enhance the appearance of the iris, the sclera and/or the limbus in addition to correcting visual defects.

More particularly, the iris is a thin diaphragm comprising mostly connective tissue and smooth muscle fibers and whose color(s), texture and patterns are unique for each individual. The color of the iris is genetically determined and depends on the amount of pigment, melanin, present in the iris structure. There is a genetic condition known as heterochromia iridum, wherein one iris may be a different color than that of the other iris. There is also a condition known as sectoral heterochomia iridum that is also genetic, wherein a section of one iris may be a different color from the remaining portion of the same iris. Various ocular pathologies may also cause these conditions. In addition, there are certain pathologies that may cause an iris to change colors over time. Accordingly, contact lenses in accordance with the present invention may be utilized both for purely cosmetic reasons and/or to address any of these conditions.

The present invention is directed to contact lenses incorporating design features that enhance the appearance of the wearer's eyes. More specifically, repeating, periodic waveforms incorporated into contact lenses in the regions corresponding to the iris serve to cosmetically enhance the appearance of the eyes by highlighting, shading and exposing the iris while maintaining a natural appearance. Conventional cosmetic enhancing contact lenses utilize either or both opaque and translucent colors to change or alter the color of an iris. In addition, tinted contact lenses have been manufactured that attempt to enhance the eye to produce a more striking appearance so as to draw attention to the eye with or without changing the color of the iris. For example, colorants that incorporate pigments capable of producing a pearl-type luster, phosphorescent pigments to produce a glow-effect, pigments with reflective material and the like are known. These types of contact lenses may not be entirely satisfactory in that the enhancement is too subtle to be noticed when the lens is on-eye or the enhancement lends an unnatural appearance to the wearer's iris.

As set forth above, contact lenses in accordance with the present invention incorporate a pattern that enhances the appearance of the lens wearer's eyes and surrounding structures. The utilization of periodic, repeating wavelike lines patterns, which may be derived from trigonometric, Fourier, polynomial, or similar functions, enhance the iris in a natural way. Since it is the geometry of lines that provides the natural appearance, it is important to note that any suitable function may be utilized in accordance with the present invention.

When placed onto or incorporated into an ophthalmic lens such as a contact lens, these periodic repeating patterns are used to create a cosmetic effect that enhances the iris. The lines may be of equal thickness, width, and spacing or unequal thickness, width, and spacing; however, in preferred embodiments the lines would be of equal width and thickness with unequal spacing thereby providing the illusion of shading and depth. The arrangement of the lines would provide peaks and troughs that radiate towards and away from the pupil creating a natural appearance and blending with the iris. The repeating waves of lines are also pigmented to enhance the color of the iris. The space between the lines provides areas where the iris appears through the pigmented area hence blending with the natural iris. Where there is no space between the lines, the iris is not readily visible.

FIG. 1 illustrates lines being used in a repeated wave pattern in accordance with an exemplary embodiment of the present invention. When the lines 100 of equal width are spaced closer to one another, as illustrated in region 102, the effect is heavier. When the lines 100 of equal width are spaced further apart, as illustrated in region 104, the effect is not as apparent and more of the background color (iris) may be revealed.

Figure 2:
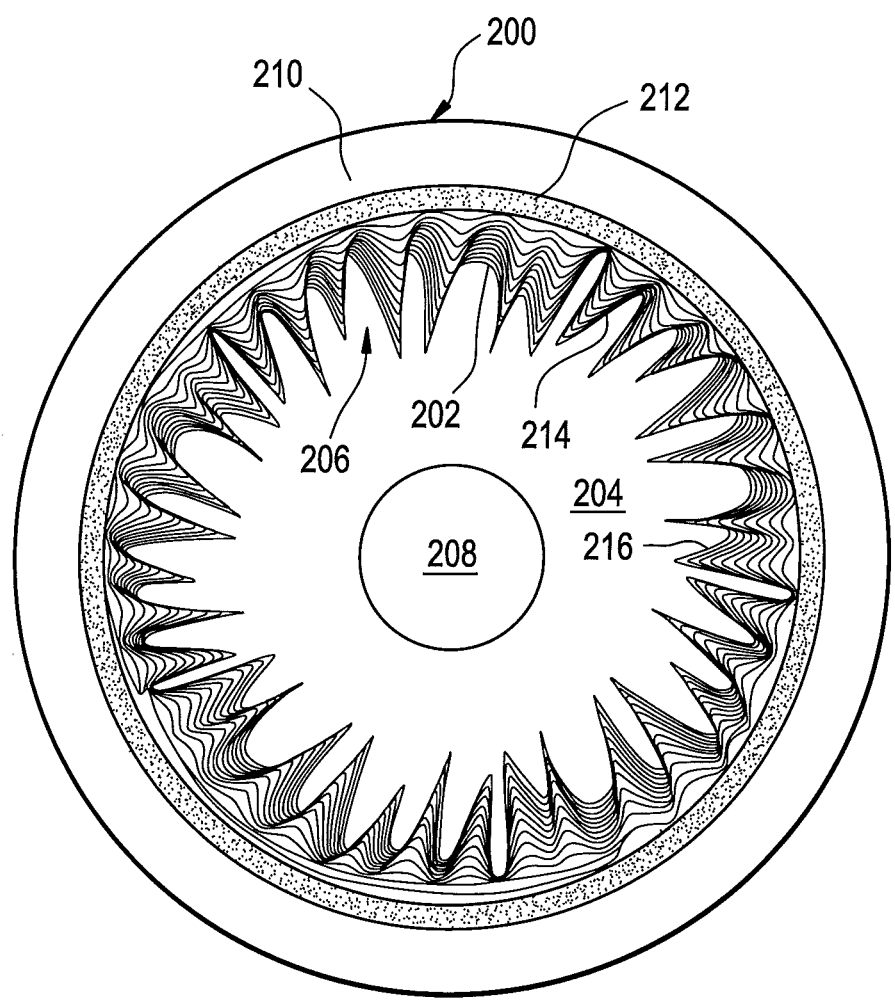
FIG. 2 is a front view of a contact lens having a first exemplary periodic, repeating wave pattern in accordance with the present invention.

FIG. 2 illustrates a first exemplary contact lens 200 incorporating a wavelike pattern of pigmented lines 202. The contact lens 200 illustrated in FIG. 2 is substantially circular in shape, but may be any convenient shape for a contact lens such as an elliptical shape or a truncated circular shape. The contact lens 200, comprises a central zone 204, which includes an effect zone 206 and a pupil region 208, and a peripheral zone 210. The peripheral zone 210 is disposed around the central zone 204 of the contact lens 200. The peripheral zone 210 has an inner diameter and an outer diameter which may, but need not necessarily coincide with the outer edge of the contact lens 200 as a whole. The exemplary contact lens 200 illustrated in FIG. 2 shows that the contact lens 200 may also comprise a limbal ring or pattern 212 that essentially separates the central zone 204 from the peripheral zone 210. The wavelike pattern of pigmented lines 202 is preferably positioned inside of the limbal ring 212 in the effect zone 206 such that it covers at least a portion of the wearer's iris. As the size of an individual's iris may vary from person to person, the size of the effect zone 206 is sized for the average size of an iris. The limbal ring 212 is an annular band of color that, when the contact lens 200 is on-eye and centered, partially or completely overlies the lens wearer's limbal region. The limbal ring 212 may be of any suitable width and comprise any suitable color. The limbal ring 212 may also be translucent or opaque. In any of the contact lenses of the present invention, the pupil region 208 of the central zone 204 preferably is clear. However, this pupil zone 208 may be an area of translucent or opaque color or any combination of opaque and translucent colors. In the most preferred exemplary embodiment of the present invention, the only pattern(s) or coloring in the central zone 204 are the repeating wavelike pattern of pigmented lines 202 in the effect zone 206. Such an arrangement provides a natural effect. The repeating wavelike pattern of pigmented lines 202 may comprise any suitable pattern as set forth above.

In a preferred exemplary embodiment, the dimensions of the placement of the periodic repeating wave pattern 202 are no larger than 14 mm in diameter and no smaller than 7 mm in diameter. The key to providing the desired cosmetic effect requires the combination of color and translucency that provides the illusion of a shadow being cast by the wearers' eyelashes. The color and translucency combination would ideally reflect natural colors (brown, black, grey) and allow some of the natural iris to be visible and provide an adequate, natural appearing, transition from pattern to natural iris.

The color selected for each of the limbal ring 212 and iris pattern pigmented lines 202 are preferably determined by the natural color of the lens wearer's iris and the enhancement and/or color change desired. Thus, the elements may be any color including, without limitation, any of a variety of hues and chromes of blue, green, gray, brown, black, yellow, red, or combinations thereof. Preferred colors for the limbal ring 212 include, without limitation, any of the various hues and chromas of black, brown and gray. As stated above, in a preferred embodiment, the pigmented lines 202 are of equal thickness and width with unequal spacing thereby providing the illusion of shading and depth. As in FIG. 1, the lines 202 have dense regions 214 where the lines 202 are closely spaced and less dense regions 216 where the lines 202 are less closely spaced.

Figure 3:
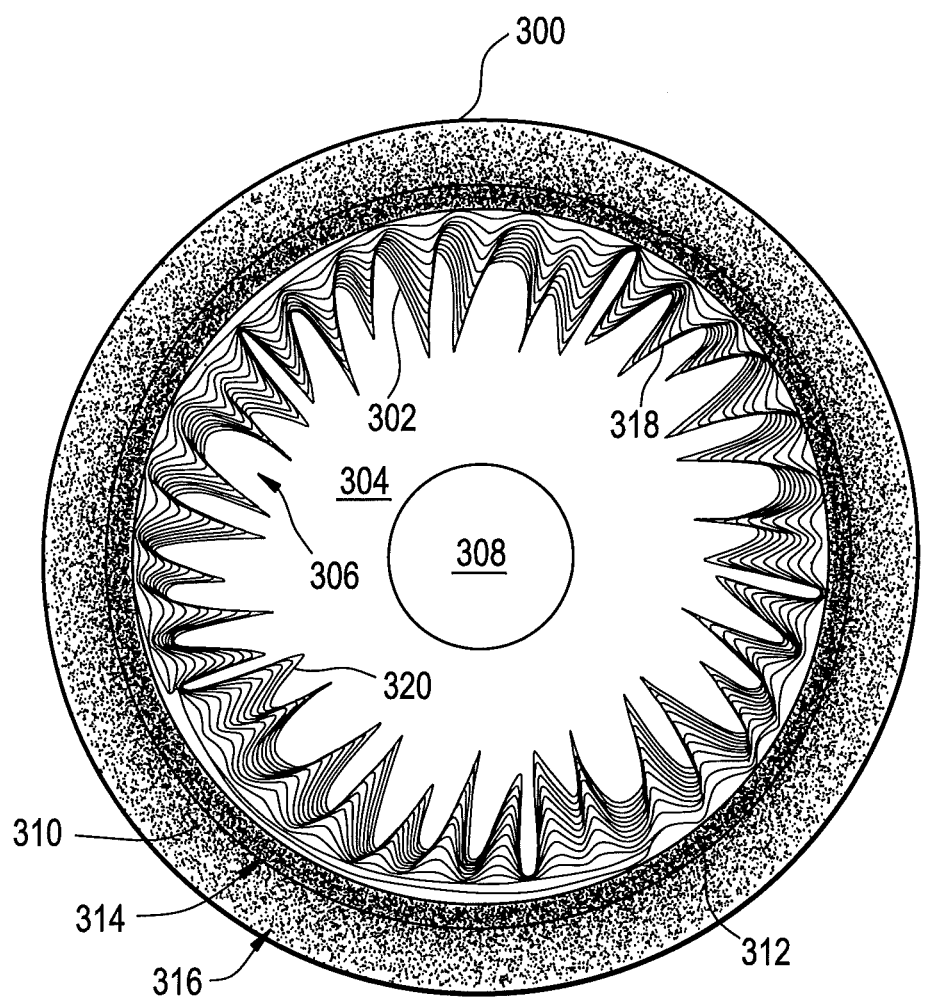
FIG. 3 is a front view of a contact lens having a second exemplary periodic, repeating wave pattern in accordance with the present invention.

FIG. 3 illustrates another exemplary contact lens 300 incorporating a wavelike pattern of pigmented lines 302. As with respect to the exemplary contact lens 200 illustrated in FIG. 2, this exemplary contact lens 300 is substantially circular in shape, but may comprise any suitable shape for a contact lens, including an elliptical shape or a truncated circular shape. The contact lens 300 comprises a central zone 304, which includes an effect zone 306 and a pupil region 308, and a peripheral zone 310. The peripheral zone 310 is disposed around the central zone 304 of the contact lens 300. The peripheral zone 310 has an inner diameter and an outer diameter which may, but need not necessarily coincide with the outer edge of the contact lens 300 as a whole. The exemplary contact lens 300 also comprises a limbal ring 312 that essentially separates the central zone 304 from the peripheral zone 312. The wavelike pattern of pigmented lines 302 is preferably positioned inside the limbal ring 312 in the effect zone 306 such that it covers at least a portion of the wearer's iris. In any of the contact lenses of the present invention, the pupil region 308 of the central zone 304 is preferably clear. However, the pupil region 308 may be an area of translucent or opaque color, or any combination of opaque and translucent colors. The exemplary contact lens 300 of FIG. 3 differs from the exemplary contact lens 200 of FIG. 2 in that in the peripheral zone 310 outside of the limbal ring 312, the contact lens 300 is colored or tinted. In other words, in addition to the wavelike pattern of lines 302 on the inside of the limbal ring 312 and in the effect zone 306, the contact lens 300 outside of the limbal ring 312 may be colored or tinted with a particular color and graduated from opaque to translucent or transparent from the region 314 closer to the limbal ring 312 to opaque at a region 316 further away from the limbal ring 312. As illustrated in FIG. 3, the pigmented lines 302 have dense regions 318 where the lines 302 are closely spaced and less dense regions 318 where the lines are less closely spaced.

As set forth above, the key to providing the desired cosmetic effect requires the combination of color and translucency that provides the illusion of a shadow being sent by the wearers' eyelashes. The color and translucency combination will ideally reflect natural colors and allow some of the iris to be visible and provide an adequate, natural appearing transition from pattern to natural iris.

Figure 4:
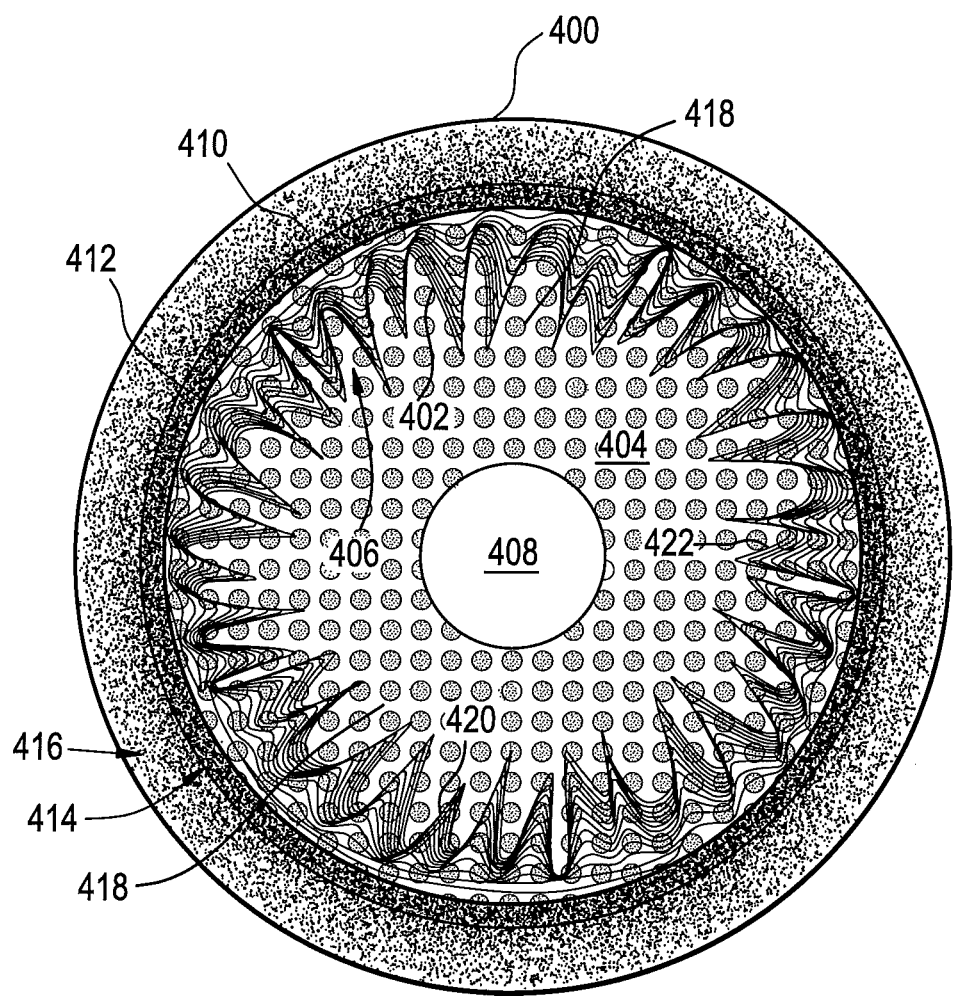
FIG. 4 is a front view of a contact lens having a third exemplary periodic, repeating wave pattern in accordance with the present invention.

FIG. 4 illustrates yet another exemplary contact lens 400 incorporating a wavelike pattern of pigmented lines 402. As with respect to the exemplary contact lens 300 of FIG. 3, this exemplary contact lens 400 is substantially circular in shape, but may comprise any suitable shape for a contact lens, including having an elliptical or truncated circular shape. The contact lens 400 comprises a central zone 404, which includes an effect zone 406 and a pupil region 408, and a peripheral zone 410. The peripheral zone 410 is disposed around the central zone 404 of the contact lens 400. The peripheral zone 410 has an inner diameter and an outer diameter which may, but not necessarily coincide with the outer edge of the contact lens 400 as a whole. The contact lens 400 also comprises a limbal ring 412 that essentially separates the central zone 404 from the peripheral zone 410. The wavelike pattern of pigmented lines 402 is preferably positioned inside the limbal ring 412 in the effect zone 406 such that it covers at least a portion of a wearer's iris. In any of the contact lenses of the present invention, the pupil region 408 of the central zone 404 is preferably clear. However, the pupil region 408 may be an area of translucent or opaque color or any combination of opaque and translucent color. The exemplary contact lens 400 of FIG. 4 differs from the exemplary contact lens 200 of FIG. 2 in that in the peripheral zone 410 outside of the limbal ring 412, the contact lens 400 is colored or tinted. In other words, in addition to the wavelike pattern of pigmented lines 402 on the inside of the limbal ring 412 and in the effect zone 406, the contact lens 400 outside of the limbal ring 412 may be colored or tinted with a particular color and graduated from opaque to translucent or transparent from the region 414 closest to the limbal ring 412 to opaque at a region 416 furthest away from the limbal ring 412. In addition, the exemplary contact lens 400 lens differs from the exemplary contact lens 300 of FIG. 3 in that the iris portion or central zone 404, excluding the pupil region 408, of the contact lens 404 is also tinted. More specifically, the central zone 404 of the contact lens 400 comprises a tinting pattern 418 in addition to the wavelike pattern of pigmented lines 402. The tinting pattern extends from the pupil region in 408 to the limbal ring 412. The tinting pattern 418 may comprise any suitable pattern and color scheme based on the wearer's natural eye color and desired effect. Once again, as illustrated in FIG. 4, the pigmented lines 402 have dense regions 420 where the lines 402 are closely spaced and less dense regions 422 where the lines 402 are less closely spaced.

It is important to note that any number of mathematical functions, for example trigonometric, Fourier, polynomial and similar functions may be utilized in accordance with the present invention. In accordance with one exemplary embodiment, a single waveform may be generated or simply drawn and then duplicated multiple times to create the pattern. Software may be written to perform the iterative function of duplicating and connecting the lines.

In general, the colored elements; namely, the wavelike pattern lines, the limbal ring and the tinted sections or regions, may be made from any organic or inorganic pigment suitable for use in contract lenses, or combinations of such pigments. The opacity may be controlled by varying the concentration of the pigment and titanium dioxide utilized, with higher amounts yielding greater opacity. Illustrative organic pigments include pthalocyanine blue, pthalocyanine green, carbazole violet, vat orange #1, and the like, as well as combinations thereof. In addition to these pigments, soluble and non-soluble dyes may be used including, dichlorotriazine and vinyl sulfone-based dyes. Useful dyes and pigment are commercially available and known to those skilled in the art.

The dye or pigment selected may be combined with one or more of a pre-polymer, or binding polymer, and a solvent to form the colorant used to produce the translucent and opaque layers used in the contact lenses of the present invention. Other additives useful in contact lens colorants also may be used. The binding polymers, solvents, and other additives useful in the color layers of the invention are known and either commercially available or methods for their making are known.

The colored elements, including one or more of the wavelike pattern lines, limbal rings and tinted regions, may be applied to, or printed on, one or more surfaces of a contact lens or may be printed onto one or more surfaces of a mold into which a contact lens forming material will be deposited and cured. In a preferred exemplary method for forming contact lenses incorporating the designs of the present invention, a thermoplastic optical mold, made from any suitable material, including cyclic polyolefins and polyolefins such as polypropylene or polystyrene resin, may be used. The elements are deposited onto the desired portion of the molding surface of the mold. The tem "molding surface" is meant to mean the surface of a mold or mold half used to form a surface of a contact lens. Preferably, the deposition is carried out by pad printing as described herein.

A metal plate, preferably made from steel or more preferably from stainless steel, is covered with a photo resist material that is capable of becoming water insoluble once cured. The elements are selected or designed and then reduced to the desired size using any of a number of techniques such as photographic techniques, placed over the metal plate, and the photo resist material is cured.

The plate is subsequently washed with an aqueous solution and the resulting image is etched into the plate to a suitable depth, for example about twenty (20) microns. A colorant containing a binding polymer, solvent, and pigment or dye is then deposited onto the elements to fill the depressions with colorant. A silicon pad of a geometry suitable for use in printing on the surface and varying hardness is pressed against the image on the plate to remove the colorant and the colorant is then dried slightly by evaporation of the solvent. The pad is then pressed against the molding surface of an optical mold. The mold is degassed for up to twelve (12) hours to remove excess solvents and oxygen after which the mold is filled with lens material. A complementary mold half is then used to complete the mold assembly and the mold assembly is exposed to conditions suitable to cure the lens material used. Such conditions are well known in the art and will depend upon the lens material selected. Once curing is completed and the lens is released from the mold, it is equilibrated in a buffered saline solution.

In a preferred exemplary embodiment, a clear, pre-polymer layer is used, which pre-polymer layer overlays at least the limbal ring and dot patterns and preferably forms the entirety of the lens' outermost surface. The pre-polymer may be any polymer that is capable of dispersing the pigment and any opacifying agent used.

The present invention may be used to provide tinted hard or soft contact lenses made of any known lens-forming material, or material suitable for manufacturing such lenses. Preferably, the contact lenses of the present invention are soft contact lenses, the material selected for forming the lenses being any material suitable for producing soft contact lenses. Suitable preferred materials for forming soft contact lenses using the method of the invention include silicone elastomers, silicone-containing macromers including those disclosed in U.S. Pat. Nos. 5,371,147, 5,314,960, and 5,057,578 incorporated in their entireties herein by reference, hydrogels, silicone-containing hydrogels, and the like as well as combinations thereof. More preferably, the contact lens may be made from a material containing a siloxane functionality, including polydimethyl siloxane macromers, methacryloxypropyl polyalkyl siloxanes, and mixtures thereof, a silicone hydrogel or a hydrogel made of monomers containing hydroxy groups, carboxyl groups, or both and combinations thereof. Materials for making soft contact lenses are well known and commercially available. Preferably, the lens material may comprise acquafilcon, etafilcon, genfilcon, lenefilcon, balafilcon, lotrafilcon, or galyfilcon.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. An ophthalmic device configured to alter the appearance of an eye, the ophthalmic device comprising:
   a contact lens having a central zone which includes a pupil region at the center thereof and an effect zone positioned around the perimeter of the central zone, and a peripheral zone surrounding the central zone, the central zone being sized to substantially correspond in size to an iris of an eye; and
   a series of pigmented lines arranged in a wavelike, repeating pattern formed in the effect zone of the central zone of the contact lens, the pigmented lines have equal widths and thickness and are configured with peaks and troughs that radiate towards and away from the pupil region, wherein the spacing between each of the pigmented lines is unequal for adding shading and depth to the iris when the contact lens is on-eye, each of the pigmented lines follows the same trajectory in the effect zone.

2. The ophthalmic device configured to alter the appearance of an eye according to claim 1, further comprising a limbal ring section positioned between the effect zone of the central zone and the peripheral zone of the contact lens.

3. The ophthalmic device configured to alter the appearance of an eye according to claim 2, wherein the limbal ring section comprises a line of predetermined thickness and color sized to substantially cover the limbus of an eye.

4. The ophthalmic device configured to alter the appearance of an eye according to claim 3, wherein the line is at least one of opaque or translucent color.

5. The ophthalmic device configured to alter the appearance of an eye according to claim 1, wherein the series of pigmented lines arranged in a wavelike, repeating pattern are derived from mathematical functions.

6. The ophthalmic device configured to alter the appearance of an eye according to claim 5, wherein the mathematical functions include trigonometric functions, polynomial functions and Fourier functions.

7. The ophthalmic device configured to alter the appearance of an eye according to claim 1, wherein the thicknesses and spacing between the series of pigmented lines are varied to create regions which substantially block visibility of the iris and regions that allow the iris to be visible.

8. The ophthalmic device configured to alter the appearance of an eye according to claim 1, further comprising at least one of coloring or tinting in the peripheral zone.

9. The ophthalmic device configured to alter the appearance of an eye according to claim 8, wherein the at least one of coloring or tinting is translucent.

10. The ophthalmic device configured to alter the appearance of an eye according to claim 8, wherein the at least one of coloring or tinting is opaque.

11. The ophthalmic device configured to alter the appearance of an eye according to claim 8, wherein the at least one of coloring or tinting graduates from translucent to opaque.

12. The ophthalmic device configured to alter the appearance of an eye according to claim 8, further comprising at least one of coloring or tinting in the central zone.

13. The ophthalmic device configured to alter the appearance of an eye according to claim 1, wherein the contact lens is a soft contact lens.

14. The ophthalmic device configured to alter the appearance of an eye according to claim 1, wherein the contact lens is a hard contact lens.

15. The ophthalmic device configured to alter the appearance of an eye according to claim 7, wherein the series of pigmented lines are at least one of colored or tinted to blend and enhance the iris of the wearer.

* * * * *